United States Patent [19]

Runyan

[11] 4,347,830

[45] Sep. 7, 1982

[54] COLLAPSIBLY SUPPORTED OUTDOOR COOKING APPARATUS

[76] Inventor: Gary D. Runyan, 92 Norma Ct., Camarillo, Calif. 93010

[21] Appl. No.: 92,606

[22] Filed: Nov. 8, 1979

[51] Int. Cl.³ .............................................. F24C 1/16
[52] U.S. Cl. .................................... 126/9 R; 126/30; 248/293; 108/134
[58] Field of Search ............... 126/9 R, 9 B, 29, 30, 126/59, 24, 25 AA, 299 C; 108/134, 135; 248/240.1, 240.4, 293, 240

[56] References Cited

U.S. PATENT DOCUMENTS

| | | | |
|---|---|---|---|
| 172,798 | 1/1876 | Timby | 126/24 |
| 1,450,802 | 4/1923 | Frye | 126/30 |
| 1,724,457 | 8/1929 | Cummings | 108/134 |
| 2,379,206 | 6/1945 | Westlake | 126/24 |
| 2,520,412 | 8/1950 | Jensen | 126/24 |
| 2,805,658 | 9/1957 | Schlueter | 126/30 |
| 2,867,471 | 1/1959 | Coon, Jr. | 126/9 B |
| 2,893,667 | 7/1959 | Shumaker | 126/30 |
| 2,912,972 | 11/1959 | Leyen | 126/25 |
| 3,094,113 | 6/1963 | Avila | 126/30 |

Primary Examiner—Samuel Scott
Assistant Examiner—Lee E. Barrett
Attorney, Agent, or Firm—Nilsson, Robbins, Dalgarn, Berliner, Carson & Wurst

[57] ABSTRACT

An outdoor cooking apparatus having a collapsible support which is pivotally mounted in the recess of an automotive spare tire rim. The pan of the cooking apparatus is pivotally attached to the end of the support and the pan and the recess form an enclosure for containing the collapsible cantilevered support when the support is collapsed and pivoted about its pivotal mounting and the pan is pivoted about its pivotal attachment to the support. When the support is collapsed and the pan pivoted, the pan's peripheral edge abuts the spare tire rim flange enclosing the support and any attachments on the support between the pan and the spare tire rim. The spare tire rim could, in one embodiment, be replaced by a portable housing having a carrying handle attached to it.

16 Claims, 5 Drawing Figures

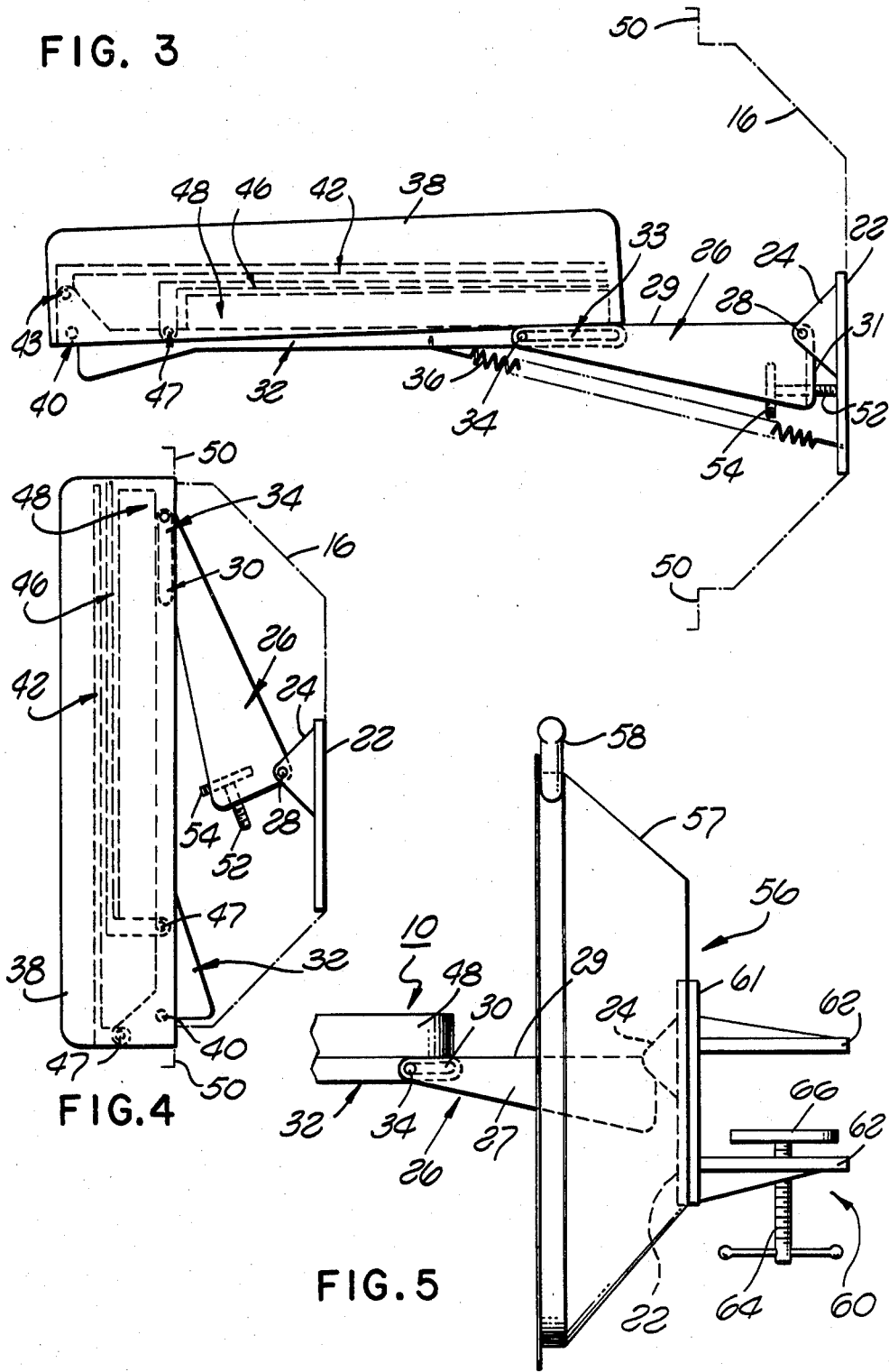

4,347,830

COLLAPSIBLY SUPPORTED OUTDOOR COOKING APPARATUS

BACKGROUND OF THE INVENTION

This invention relates generally to a support for an outdoor cooking apparatus. More particularly, this invention concerns a collapsible cantilevered support for an outdoor cooking apparatus. The collapsible support and accessories mounted thereon are foldable into the interior of an enclosure defined by the pan of the cooking apparatus and a housing to which the cantilevered support is attached. The housing constitutes the rim of the spare tire, mounted on a vehicle or a portable housing.

In the past it has been common to attach legs to the bottom of the pan of an outdoor cooking apparatus, e.g., a barbecue grill, by bolting the legs to the pan or otherwise relatively permanently attaching the legs to the pan, with the only portability of the cooking apparatus residing in attaching wheels to some or all of the legs. When it was desired to use the cooking apparatus away from one's own home, e.g., on a camping trip, it has been necessary in the past to disassemble the legs from the pan in order to conserve space in the vehicle which transports the campers to the camping location and to reassemble the cooking apparatus at the location with a subsequent disassembly and reassembly for the return journey home. Alternatively, one could take the entire cooking apparatus as assembled, which is partically impossible when traveling in a car and particularly cumbersome even inside a relatively roomy recreational vehicle. Such portable cooking apparatuses have thus exhibited at best a modicum of utility for purposes of camping away from home, and room for significant improvement remains.

The problems enumerated in the foregoing are not intended to be exhaustive, but rather are among many which tend to impair the effectiveness of previously known portable outdoor cooking apparatuses. Other noteworthy problems may also exist; however, those presented above should be sufficient to demonstrate that portable cooking apparatuses appearing in the art have not been altogether satisfactory.

SUMMARY OF THE PREFERRED EMBODIMENTS OF THE INVENTION

Recognizing the need for an improved portable cooking apparatus, it is, therefore, the purpose of the present invention to provide a portable cooking apparatus which minimizes or reduces the problems of the type previously noted.

An outdoor cooking apparatus capable of accomplishing this purpose consists of an outdoor cooking apparatus pivotally mounted at the end of a collapsible cantilevered support, which support is pivotally attached within a recessed portion of an automotive spare tire rim removably mounted on a vehicle. The pan is rotatable between a horizontal cooking position and a vertical position in abutting relation to the peripheral edge of the automotive spare tire rim, with the collapsed support being contained in a cavity defined by the interior portion of the pan and the recessed portion of the rim when the pan is in abutting relation to the rim. In an alternative embodiment, the support is pivotally attached within a recessed portion of a portable housing and the cavity containing the collapsed support is defined by the interior portion of the pan and the recessed portion of the housing. The housing may have a carrying handle attached thereto for convenience in carrying the cooking apparatus and a clamping mechanism for affixing the housing to a suitable base to hold the housing with the support and pan in the horizontal cooking position.

Examples of the more important features of this invention have thus been summarized rather broadly in order that the detailed description that follows may be better understood, and in order that the contribution to the art may be better appreciated. There are, of course, additional features of the invention that will be described hereafter which will also form the subject of the appended claims.

BRIEF DESCRIPTION OF THE DRAWINGS

FIG. 3 is a side elevational view of the apparatus shown in FIGS. 1 and 2 with the pan folded over the extension according to the present invention and the support in the uncollapsed horizontal extended position;

FIG. 4 is a side elevational view of the apparatus of the present invention with the cantilevered support collapsed and the pan folded over the extension and abutting the automotive spare tire rim or the housing (shown in phantom) in accordance with the present invention;

FIG. 5 is a side elevational view of a portion of the apparatus shown in FIGS. 1-4 with a second embodiment of the housing in accordance with the present invention with a portable housing substituted for the automotive spare tire rim and with the housing having a carrying handle and a clamping mechanism to attach the housing to a suitable base for mounting the cooking apparatus in the horizontal cooking position.

DETAILED DESCRIPTION OF THE PREFERRED EMBODIMENTS OF THE INVENTION

Figure 1:
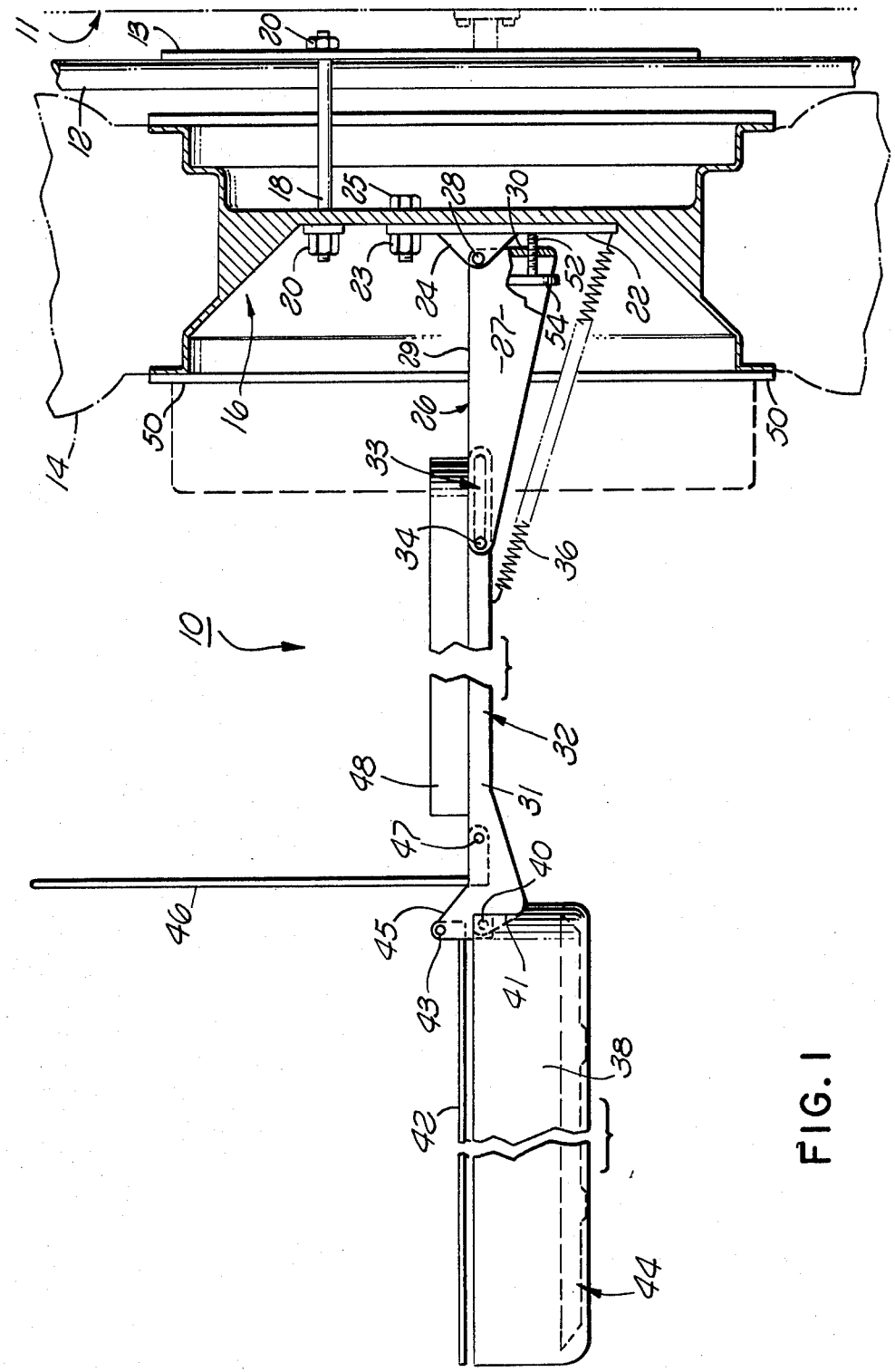
FIG. 1 is a side elevational view of the apparatus of the present invention showing the automotive spare tire rim in cross section and the support and pan of the present invention in the horizontal fully extended cooking position, and illustrating in phantom the position of the pan in abutting relation to the rim.

Turning first to FIG. 1, a partially cut away side elevational view of a collapsible cantilevered support 10 for an outdoor cooking apparatus, in accordance with the present invention, is shown. The embodiment shown in FIG. 1 is specifically adaptable for use with a vehicle, e.g., a recreational camper, of which a back wall 11 is shown in FIG. 1. The back wall 11 has a spare tireholding mount 12 attached to it. Attached to the spare tire holding mount 12 is a holding plate 13. A spare tire 14, partially shown in phantom, is mounted as is usual on a spare tire rim 16, shown in cross-section, which rim 16 is attached to holding plate 13 by bolt 18 and nuts 20.

The hub portion of the rim 16, forming a recessed area, has attached to it, within the recessed area, a mounting plate 22, e.g., by bolting the mounting plate 22 to the hub portion of the rim 16 by at least one bolt 23 and nuts 25 through the normal lug holes of the rim 16.

A mounting bracket 24 is attached to or integral with mounting plate 22. The collapsible cantilevered support 10 has an arm 26 which is pivotally attached to mounting bracket 24 by a pivot pin 28. The arm 26 is formed by bending a flat pimember having side walls 27, a top plate 29, and a back plate 30. The seams between the side walls 27 and back plate 30 may be welded as desired for additional strength and rigidity of the arm 26.

Figure 2:
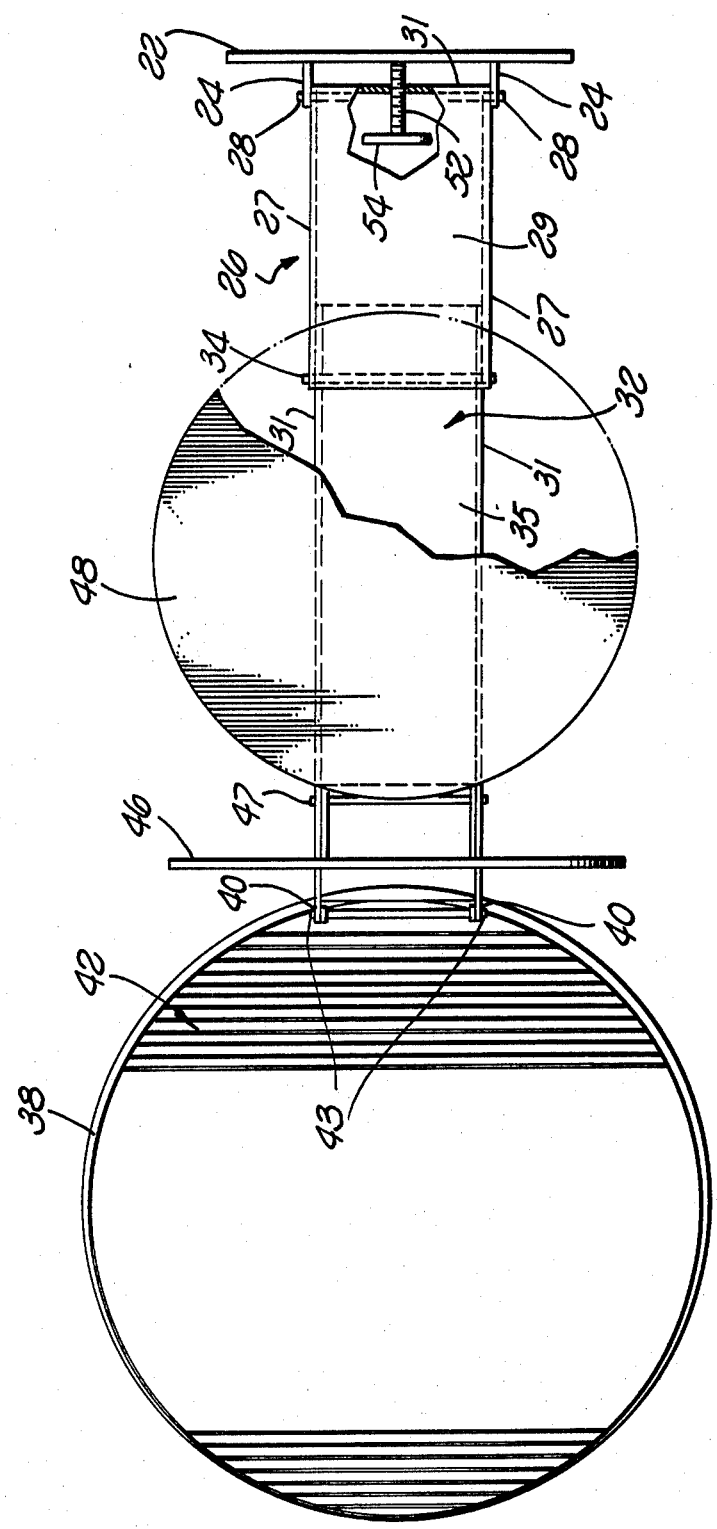
FIG. 2 is a partially cut away plan view of a portion of the apparatus shown in FIG. 1 without showing the automotive spare tire rim or its attachment to the vehicle.

An extension 32 having side walls 31 is pivotally connected to the arm 26 by pin 34 which passes through the side walls 27 of the arm 26 and is contained within a groove 33 formed in each of the respective side walls 31 of the extension 32. The extension 32 may also be constructed into a generally U-shaped member having a top portion 35 extending along part of its length as shown in FIG. 2. A spring 36 is attached to the extension 32 and the mounting plate 22.

A cooking pan 38 is pivotally attached to the end of the extension 32 by a pivot pin 40 contained in the end of the extension 32. The extension 32 has a downwardly extending protrusion 41 which engages the outer surface of the pan 38 when the pan is pivoted into the horizontal position shown in FIG. 1 to hold the pan in the horizontal position.

A fire pan 44 for holding the hot coals may be removably placed within the cooking pan 38. A grill member 42 is pivotally connected to the extension 32 by a pivot pin 43 contained within an upwardly extending protrusion 45 of the extension 32. A heat shield 46 is pivotally connected to the extension 32 by pivot pin 47. A cutting board 48 is attached to the top 35 of the extension 32 and is of such a size and shape to fit within the interior of the cooking pan 38, e.g., circular as shown in FIG. 2.

In operation, with the cooking pan 38 and cantilevered support 10 fully extended as shown in FIG. 1 and FIG. 2, the side walls 31 of the extension 32 fit between the side walls 27 of the arm 26 and the sidewalls 31 and top 35 of the extension 32 fit underneath the top 29 of the arm 26. Then the pressure of the spring 36 may be used to assist in locking the arm 26 and extension 32 in the fully extended horizontal position shown in FIGS. 1 and 2, since the spring 36 pulls the extension 32 towards the mounting bracket 24, thus sliding the pin 34 in the slot 33 to the full extent allowable by the slot 33. In this position, the cantilevered support 10 is locked in the horizontal and fully extended position and the extension 32 is prevented from rotating about the pin 34 due to the side walls 31 and top portion 35 of the extension 32 engaging the underside of the top 29 of the arm 26. The pan 38 is pivoted to the horizontal position with the downwardly extending protrusions 41 locking the pan 38 in the horizontal position. The grill 42 and heat shield 46 are shown in FIG. 1 in the normal operating positions with the grill 42 extending over the interior portion of the pan 38 containing the hot coals in the fire tray 44, and the heat shield 46 extending vertically to assist in insulating the cutting board 48 area and spare tire 14 from the heat of the coals. The grill 42 and heat shield 46 may be of any size and shape so long as they will fit within the interior portion of the pan 38, e.g., circular as shown in FIG. 2 with respect to the grill 42.

When the cooking has been completed and the coals have been doused and cooled, the fire pan 44 is preferably removed from the interior portion of the pan 38. The heat shield 46 is folded across the top of the cutting board 48 by pivoting the heat shield 46 about pivot pin 47 as is shown in FIG. 3. The grill 42 is then folded on top of the heat shield 46 by pivoting the grill 42 about pivot pin 43, and the pan 38 is then folded about pivot pin 40 to essentially enclose the cutting board 48, heat shield 46, and grill 42. It will be noted, as shown in FIG. 1, that the grill 42 is of sufficient length when pivoted to the horizontal position over the pan 38 to touch the edge of the pan 38 thus giving it support on its outward end opposite from the pivot pin 43. However, due to the fact that the pivot pin 43 has an axis which is at a greater distance from the mounting plate 22 than the axis of pivot pin 40 of the pan 38, when the pan 38 is folded over the grill 42, heat shield 46, and cutting board 48, the grill 42 will fit within the interior portion of the pan 38 as is shown in FIG. 3.

At this point, the extension 32 is pulled outwardly from the mounting plate 22, against the spring pressure of the spring 36 if such a spring is used, to slide the pin 34 in the groove 33 sufficiently to disengage the side walls 31 and top portion 35 from the underside of the top 29 of the arm 26, to allow the side walls 31 to pivot about the pin 34. At the same time this pivots the arm 26 about its pivot point 28 causing the cantilevered support 10 to fold with the pan 38 engaging flanges 50 of the rim 16, thereby enclosing the collapsible cantilevered support 10 and the cooking accessories, the grill 42, heat shield 46 and cutting board 48, attached to the cantilevered support 10, within the interior of a space defined by the recessed area of the rim 16 and the interior portion of the pan 38. An adjusting nut 52 extends through the back wall 30 of the arm 26 to adjust the horizontal position of the extended collapsible cantilevered support 10 and pan 38 by turning handle 54 of the adjusting nut 52 as is shown in FIG. 1.

Turning now to FIG. 5, an alternative embodiment of the present invention is shown with the identical arm 27 and extension 32 and associated cooking accessories shown partially cut away. In this embodiment, the mounting bracket 24 is attached to or integral with a mounting plate 22 which is further attached to the inside of a cover 57 having a handle 58 attached thereto. A clamp assembly 60 is attached to the outer surface of the cover 57 by attaching a clamp assembly plate 61, which may be integral with the mounting plate 22, to the outer surface of the cover 57. The clamp assembly has two brackets 62 attached to the clamp assembly plate 61 and a typical clamp spindle 64 and clamp plate 66. With the exception of the use of the clamp assembly 60 to form a base for the cantilevered support 10 and pan 38 once extended, the operation of the embodiment shown in FIG. 5 is the same as that for the embodiment shown in FIGS. 1-4. When the pan is folded over onto the extension 32 and the extension 32 pulled outwardly to release the engagement between the extension 32 and the arm 27, as shown in FIGS. 3 and 4, the peripheral portions of the pan 38 will abut the periphery of the cover 57, thus enclosing the cantilevered support 10 and the cooking accessories connected to the cantilevered support 10 within the interior space defined by the interior portion of the cover 57 and the interior p

SUMMARY OF ADVANTAGES AND SCOPE OF THE INVENTION

It will be appreciated that in constructing a collapsible cantilevered support for an outdoor cooking apparatus according to the present invention, certain significant advantages are provided.

In particular, a portable cooking apparatus is provided which is collapsible into a very confined space, e.g., the space defined by the interior section of the pan and the recessed portion of the rim of a tire as shown in FIGS. 1-4, or the interior portion of the housing 57 and the interior portion of the pan 38 as shown in FIG. 5.

The foregoing description of the invention has been directed to particular preferred embodiments in accordance with the requirements of the Patent Statutes and for the purposes of explanation and illustration. It will be apparent, however, to those skilled in this art that many modifications and changes in both the apparatus and method may be made without departing from the scope and spirit of the invention. For example, instead of the side walls 31 and top 35 of the extension 32 engaging the underside of top 29 of the arm 26, thereby acting as a stop member to prevent the extension 32 from pivoting about the pivot pin 34, thus holding the collapsible cantilevered support 10 in the extended horizontal position, other well known stop member means could be attached to either the arm 26 or the extension 32 to prevent pivoting of the extension 32 when the collapsible cantilevered support 10 is in the horizontal fully extended position. Further, the slot 33 could be positioned in the side walls 27 of the arm 26 and the pivot pin 34 attached to the side walls 31 of the extension 32 and slideably engaging the slot 33. It will further be apparent that the invention may also be utilized, with suitable modifications within the state of the art which would be apparent to those skilled in the art. For example, in some mountings for spare tires on recreational vehicles, a bracket, attached to a frame mounted on the vehicle, extends through a center opening in the rim of the spare tire and forms a support for the spare tire. One or more bolts may then be used through the lug holes to further hold the space tire rim on the brackets. One skilled in the art would know that the mounting plate 22 of the present invention could be bolted or otherwise affixed to such a bracket rather than directly to the spare tire rim and the collapsible cantilevered support 10 of the present invention suitably adjusted in size so that the pan 38 when folded back on the collapsed support 10 would abut the spare tire rim peripheral edge 50. In addition, it is not required that the pan 38 be used with the fire tray 44 for containing, e.g., charcoal. The same pan 38 could form a housing for, e.g., butane gas stove elements, which are removable from the pan 38 or collapsible sufficiently to the bottom of the pan 38 to allow the pan to be folded over and to enclose the collapsible cantilevered support 10 and attached accessories. Such a butane gas stove could be fueled by a butane bottle detachably mounted in the interior portion of the pan 38 or by an external bottle with the pan 38 having suitable butane supply lines passing through it to an external fitting for attaching the butane bottle. It is the Applicant's intention in the following claims to cover all such equivalent modifications and variations as fall within the true spirit and scope of the invention.

What is claimed is:

1. An outdoor cooking apparatus comprising:
a mounting bracket;
a collapsible cantilevered support having a first end and a second end and pivotally attached to the mounting bracket at the first end thereof, said support including an arm pivotally attached to the mounting bracket at one end of the arm, and an extension pivotally attached to the other end of the arm at one end of the extension; and
a pan, pivotally attached to the extension at the other end of the extension, said pivotal attachment being such that the pan folds over the extension, and the extension being of such size and shape so as to fit within the interior of the pan when the pan is folded over the extension.

2. The apparatus of claim 1, wherein the collapsible cantilevered support further comprises:
the arm being a generally U-shaped member having opposing side walls and a top, the top having an underside;
the extension having a first side wall and a second side wall; and,
the pivotal attachment of the arm to the extension including a slot contained in the side walls of at least one of the arm and the extension, and a pin, having a longitudinal axis, and attached to the side walls of the other of the arm and the extension, and passing through the slot.

3. The apparatus of claim 2, further comprising:
the extension being slideable towards the mounting bracket to the extent allowable by the pin slideably engaging the slot with the side walls of the extension engaging the underside of the top, thereby locking the cantilevered support in the extended horizontal position; and,
the extension being slideable in a direction away from the mounting bracket, thereby releasing the locking engagement between the arm and the extension and allowing the arm and the extension to fold about the longitudinal axis of said pin.

4. The apparatus of claim 1, further comprising:
clamp means attached to the mounting bracket for clamping the collapsible cantilevered support to a desired object sufficiently immovable to act as a base for the support and the pan.

5. The apparatus of claim 2, further comprising:
clamp means attached to the mounting bracket for clamping the collapsible cantilevered support to a desired object sufficiently immovable to act as a base for the support and the pan.

6. The apparatus of claim 3, further comprising:
clamp means attached to the mounting bracket for clamping the collapsible cantilevered support to a desired object sufficiently immovable to act as a base for the support and the pan.

7. An outdoor cooking apparatus, comprising:
a mounting bracket;
an arm pivotally attached to the mounting bracket at the one end of the arm;
an extension pivotally attached to the other end of the arm at one end of the extension;
a pan pivotally attached to the other end of the extension;
at least one of the arm and the extension having a pin attached thereto and the other of the arm and the extension having a slot, with the pin having a pivotal axis and being in slideable engagement in the slot;
a stop member attached to at least one of the arm and the extension; and,
the extension pivoting about the pivotal axis, and the arm pivoting about the pivotal attachment to the mounting bracket in response to the extension being moved along its longitudinal axis sufficiently to disengage the stop member.

8. An outdoor cooking apparatus comprising:
a mounting bracket;
an arm pivotally attached to the mounting bracket at one end of the arm;

the arm having a slot located generally at the other end of the arm, the slot having a first end and a second end, the second end of the slot being disposed closer to the other end of the arm than to the one end of the arm;

an extension having a pin attached thereto which is slideably engaged by the slot, the pin having a pivotal axis;

a stop member attached to at least one of the arm and the extension;

the extension pivoting about the pivotal axis, and the arm pivoting about the pivotal attachment of the arm to the mounting bracket, in response to the extension being moved longitudinally of the arm, thereby sliding the pin in the slot to the second end of the slot and disengaging the stop member; and, a pan pivotally attached to the extension.

9. An outdoor cooking apparatus comprising:

a mounting bracket;

a collapsible cantilevered support having a first end and a second end and pivotally attached to the mounting bracket at the first end thereof, said support including a generally U-shaped arm having opposing side walls and a top having an underside, said arm being pivotally attached to the mounting bracket at one end of the arm, and an extension having a first side wall and a second side wall, said extension being pivotally attached to the other end of the arm at one end of the extension; and a pan pivotally attached to the extension at the other end of the extension;

said pivotal attachment of the arm to the extension including a slot contained in the side walls of at least one of the arm and the extension, and a pin, having a longitudinal axis, and attached to the side walls of the other of the arm and the extension, and passing through the slot;

said extension being slideable towards the mounting bracket to the extent allowable by the pin slideably engaging the slot with the side walls of the extension engaging the underside of the top, thereby locking the cantilevered support in the extended horizontal position;

said extension being slideable in a direction away from the mounting bracket, thereby releasing the locking engagement between the arm and the extension and allowing the arm and the extension to fold about the longitudinal axis of the pin.

10. The apparatus of claim 9, further comprising:

clamp means attached to the mounting bracket for clamping the collapsible cantilevered support to a desired object sufficiently immovable to act as a base for the support and the pan.

11. An outdoor cooking apparatus comprising:

an automotive tire rim having a recessed portion surrounded by a peripheral flange, the rim removably mounted on an automotive vehicle as a spare tire;

a mounting bracket attached adjacent the recessed portion;

a collapsible cantilevered support having a first end and pivotally attached at said first end within the recessed portion for rotation between an extended position and a collapsed vertical position, said support including an arm pivotally attached to the mounting bracket at a first end of the arm, and an extension pivotally attached to a second end of the arm at a first end of the extension; and a pan, having a cooking surface and having a peripheral edge, said pan being pivotally attached to a second end of the extension for rotation between a horizontal position for cooking and a vertical position in abutting relation to the peripheral flange of the rim for enclosing the support, in the collapsed position, in a cavity defined by the interior of the pan and the recessed portion of the rim, wherein the pivotal attachment of the pan to the extension is such that the pan folds over the extension, and the extension is of such size and shape so as to fit within the interior of the pan when the pan is folded over the extension.

12. The apparatus of claim 11 wherein the collapsible cantilevered support further comprises:

the arm being a generally U-shaped member having opposing side walls and a top, the top having an underside;

the extension having a first side wall and a second side wall; and, the pivotal attachment of the arm to the extension including a slot contained in the side walls of at least one of the arm and the extension, and a pin, having a longitudinal axis, and attached to the side walls of the other of the arm and the extension, and passing through the slot.

13. The apparatus of claim 12, further comprising:

the extension being slideable towards the mounting bracket to the extent allowable by the pin slideably engaging the slot with the side walls of the extension engaging the underside of the top, thereby locking the cantilevered support in the extended horizontal position; and, the extension being slideable in a direction away from the mounting bracket, thereby releasing the locking engagement between the arm and the extension and allowing the arm and the extension to fold about the longitudinal axis of said pin.

14. An outdoor cooking apparatus comprising:

an automotive tire rim having a recessed portion surrounded by a peripheral flange, the rim removably mounted on an automotive vehicle as a spare tire;

a mounting bracket attached adjacent the recessed portion;

a collapsible cantilevered support having a first end and pivotally attached at said first end within the recessed portion for rotation between an extended position and a collapsed vertical position, said support including a generally U-shaped arm, having opposing side walls and a top having an underside, pivotally attached to the mounting bracket at a first end of the arm, and an extension having a first side and second side walls pivotally attached to a second end of the arm at a first end of the extension, pivotal attachment of the arm to the extension including a slongitudinal axis, and attached to the side walls of the other of the arm and the extension, and passing through the slot; and a pan, having a cooking surface and having a peripheral edge, said pan being pivotally attached to a second end of the extension for rotation between a horizontal position for cooking and a vertical position in abutting relation to the peripheral flange of the rim for enclosing the support, in the collapsed position, in a cavity defined by the interior of the pan and the recessed portion of the rim.

15. The apparatus of claim 14, further comprising:

the extension being slideable towards the mounting bracket to the extent allowable by the pin slideably engaging the slot with the side walls of the extension engaging the underside of the top, thereby locking the cantilevered support in the extended horizontal position; and, the extension being slideable in a direction away from the mounting bracket, thereby releasing the locking engagement between the arm and the extension and allowing the arm and the extension to fold about the longitudinal axis of the pin.

16. An outdoor cooking apparatus comprising:

a mounting bracket;

a collapsible cantilevered support having a first end and a second end and pivotally attached to the mounting bracket at the first end thereof, said support including an arm pivotally attached to the mounting bracket at one end of the arm, and an extension pivotally attached to the other end of the arm at one end of the extension; and a pan pivotally attached to the extension at the other end thereof;

an automotive tire rim having a recessed portion surrounded by a peripheral flange, the rim removably mounted on an automotive vehicle as a spare tire;

the collapsible cantilevered support being pivotally attached at one end of the arm within the recessed portion for rotation between an extended position and a collapsed position; and the pan, having a cooking surface and having a peripheral edge, and being pivotally attached to the other end of the extension for rotation between a horizontal position for cooking and an enclosing position in abutting relation to the peripheral flange of the rim for enclosing the support, in the collapsed position, in a cavity defined by the interior of the pan and the recessed portion of the rim.

* * * * *

UNITED STATES PATENT AND TRADEMARK OFFICE
CERTIFICATE OF CORRECTION

PATENT NO. : 4,347,830
DATED : September 7, 1982
INVENTOR(S) : GARY D. RUNYAN

It is certified that error appears in the above-identified patent and that said Letters Patent are hereby corrected as shown below:

Col. 1, line 30, change "partically" to --practically--.
Col. 3, line 5, delete "pimember" and insert --piece of metal which is cut in the shape generally of a cut-off triangle, having the apex cut off, and a rectangular extension from the base thereof, into a generally U-shaped member--.
Col. 4, line 58, after "interior", delete the "p" and insert --portion of the pan 38 as is shown in FIG. 4. With the clamp assembly loosened, the handle 58 can then conveniently be used to transport the cooking apparatus.--.

Col. 8, line 57, delete "slogitudinal" and insert --slot contained in the side walls of at least one of the arm and the extension, and a pin, having a longitudinal--.

Claim 15, line 13, change "the" (second occurrence) to --said--.

Signed and Sealed this

First Day of February 1983

[SEAL]

Attest:

GERALD J. MOSSINGHOFF

Attesting Officer

Commissioner of Patents and Trademarks